July 4, 1967 T. J. HAJDUK 3,329,422
SEALING FIXTURE
Filed Aug. 28, 1964 2 Sheets-Sheet 2

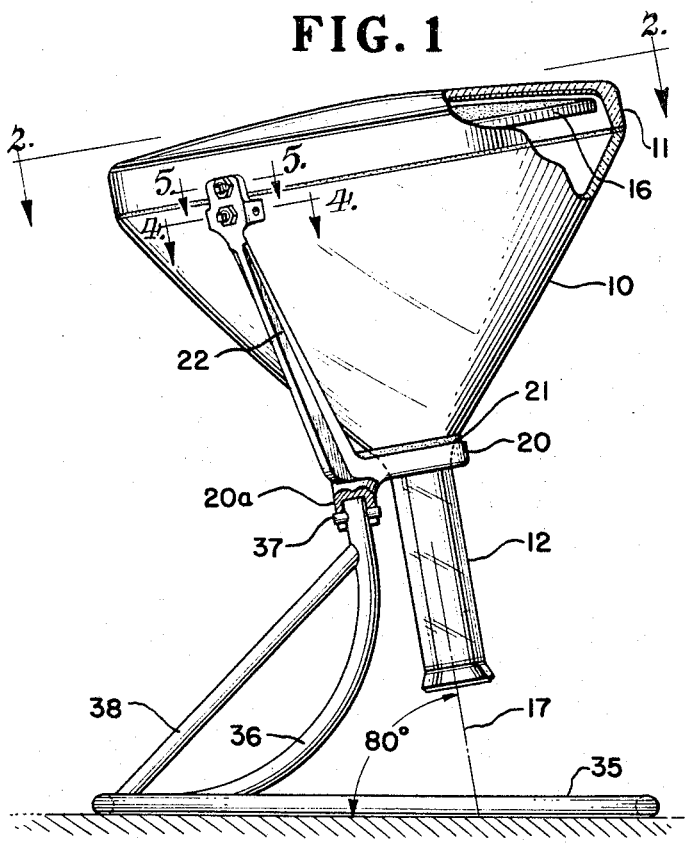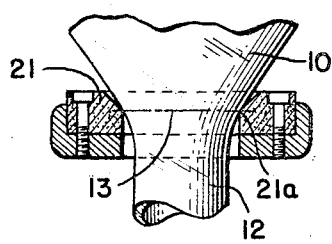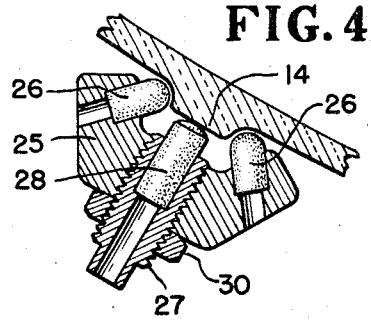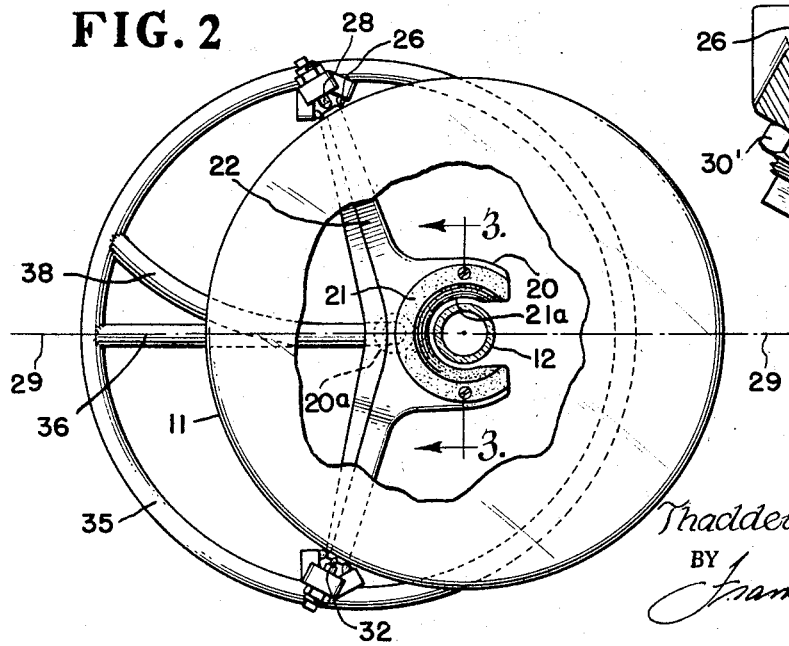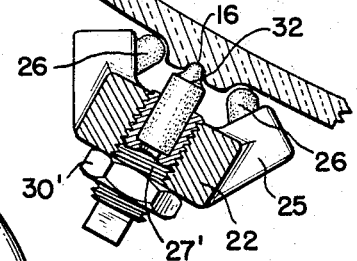

INVENTOR.
Thaddeus J. Hajduk
BY Francis W. Crotty
ATTY.

United States Patent Office 3,329,422
Patented July 4, 1967

3,329,422
SEALING FIXTURE
Thaddeus J. Hajduk, Chicago, Ill., assignor to The Rauland Corporation, Chicago, Ill., a corporation of Illinois
Filed Aug. 28, 1964, Ser. No. 392,712
8 Claims. (Cl. 269—287)

The present invention is directed to a sealing fixture to be used in the fabrication of a shadow-mask type of color cathode-ray tube.

Such tubes, as presently constructed, have an envelope of two principal parts, a funnel and a cap. These parts are separate initially to facilitate forming a multicolor phosphor screen on the image surface of the cap. After the screen has been formed, the cap and funnel are united by means of a glass frit which, when heated to around 400° C. for an appropriate interval, integrates the envelope sections. Difficulty has heretofore been experienced in maintaining the envelope sections in proper space relation during sealing. The need for maintaining precise relations of these parts during sealing will be apparent from consideration of the techniques by which the screen is formed on the cap.

In accordance with current practices, the screen area of the cap is coated with a composition of a photosensitive resist and a phosphor which emits light of one of the primary colors in response to electron bombardment. The shadow mask is then positioned within the cap and this assembly is installed in an exposure chamber or lighthouse wherein selective portions of the coating are exposed to light. In order to precisely determine the areas of the coating that are to be exposed, the light source is located in the same position, relative to the screen area, as the particular electron gun of the finished tube which is to control excitation of the particular color phosphor being processed. After this exposure, the unexposed portions of the coating are removed and the procedure is repeated for the remaining primary colors but in each instance with the light source properly located to simulate a particular one of the electron guns of the tube. The final screen structure is a multiplicity of color triads over the entire image area of the cap, each triad including a dot of green phosphor, one of blue and one of red, all of which have been precisely located by simulating in the lighthouse the geometry of the tube in respect of its screen and electron guns. Sealing of the cap to the funnel must be most carefully accomplished in order to preserve this same relation of screen to electron guns in the finished tube.

One approach to the sealing problem employs a fixture in which the funnel is mounted with its large diameter uppermost and with two locating bosses or index provisions that have been cast on the external surface of the funnel resting against a pair of index pins. Of course, a thin layer of sealing frit will have previously been applied to the sealing rim of the funnel. The cap is then superposed on the funnel with their sealing rims in concentric and facing relation, this being accomplished by another pair of index pins mounted immediately above those supporting the funnel. This other pair of pins engages index provisions cast on the outer periphery of the cap. The index elements have a separation of 120° and the fixture is arranged to hold the funnel and cap combination off vertical by about 10° so that the envelope parts are urged by gravity against the index pins.

This arrangement is further characterized by an asymmetry in that the index pins are not in symmetrical relation to the direction of tilt. As a consequence, the weight of the combination bears more heavily on one pair of index pins than on the other which prevents relative movement of this pair of pins and the funnel and cap sections. However, the reduced pressure against the other pair of index pins does accommodate relative movement of the parts which occurs during the sealing process because of unlike thermal coefficients of expansion in the overall assembly. It is much preferred, however, that the sealing fixture be arranged without the requirement of unequal loading to accommodate differences in cofficients of expansion.

It is therefore an object of the present invention to provide a new and improved fixture for sealing the cap and funnel sections of a color cathode-ray tube.

It is a specific object of the invention to provide a sealing fixture for a color cathode-ray tube wherein relative movement of the parts is minimized or avoided during the sealing process.

A sealing fixture, constructed in accordance with the invention, is particularly useful in the fabrication of a color cathode-ray tube having a funnel with a plurality of index provisions spaced on its external surface at a fixed distance from a transverse reference plane located in a small diameter portion of the funnel and referred to as the yoke reference line. The tube under consideration also has a cap with a similar plurality of index provisions spaced on its external surface in the manner of those on the funnel. The fixture itself for accommodating these parts during sealing comprises a workholder having an annular seat with an internal diameter equal to the diameter of the funnel at the yoke reference line. A plurality of arms included in the workholder extend upwardly from the seat and have a spacing corresponding to that of the index provisions of the funnel. A first set of index devices or pins is carried by the arms at such a distance from the seat to permit engaging the index provisions of the funnel. A second set of index devices is also carried by the arms immediately above the first set for engaging the index provisions of the cap. There is a base or pedestal member and a support for the workholder extends upwardly from the base, establishing for a funnel and cap combination contained in the workholder an axis that is canted from the vertical by a selected amount. The plan dimensions of the base exceed the projected dimensions of the funnel-cap combination on the base and the workholder has the same coefficient of thermal expansion as the funnel and cap. Moreover, the workholder is angularly oriented relative to the base to have substantially equal loading of the index devices by a funnel and cap combination contained in the workholder.

The invention is useful in the fabrication of both round and rectangular tubes. For round tubes, the index devices are symmetrically located relative to the direction of tilt and their loading is substantially equal. In the case of a rectangular tube, however, index devices engage the funnel and cap at two points along their major dimension and at one point along the minor dimension. In this case the fixture is not only canted from the vertical but is also tilted in the general direction of the junction of the major and minor dimensions so that the index devices are again loaded substantially uniformly.

The features of the present invention which are believed to be novel are set forth with particularity in the appended claims. The invention, together with further objects and advantages thereof, may best be understood by reference to the following description taken in connection with the accompanying drawings, in the several figures of which like reference numerals identify like elements, and in which:

FIGURE 1 is an elevational view of a sealing fixture in accordance with the invention holding the funnel and cap sections of a round color cathode-ray tube in position for sealing;

FIGURE 2 is a plan view, taken as indicated by section line 2—2 in FIGURE 1, e.g. in the direction of the center line of the funnel-cap combination contained in the fixture;

FIGURE 3 is an enlarged view, taken along section line 3—3 of FIGURE 2, of the seat of the fixture and the portion of the tube including the yoke reference line;

Figure 6:
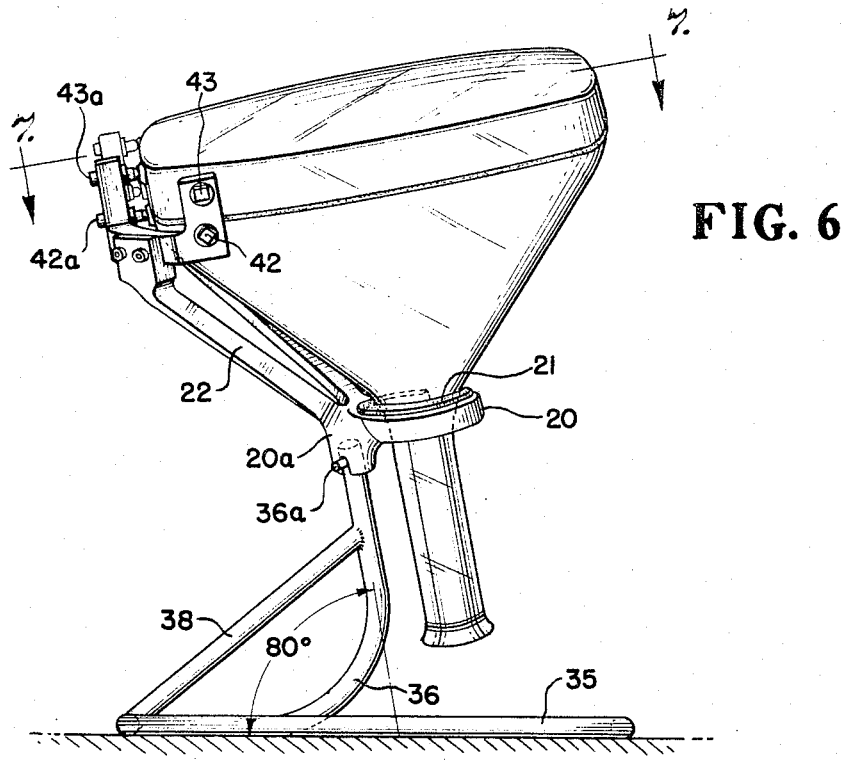
Figure 7:
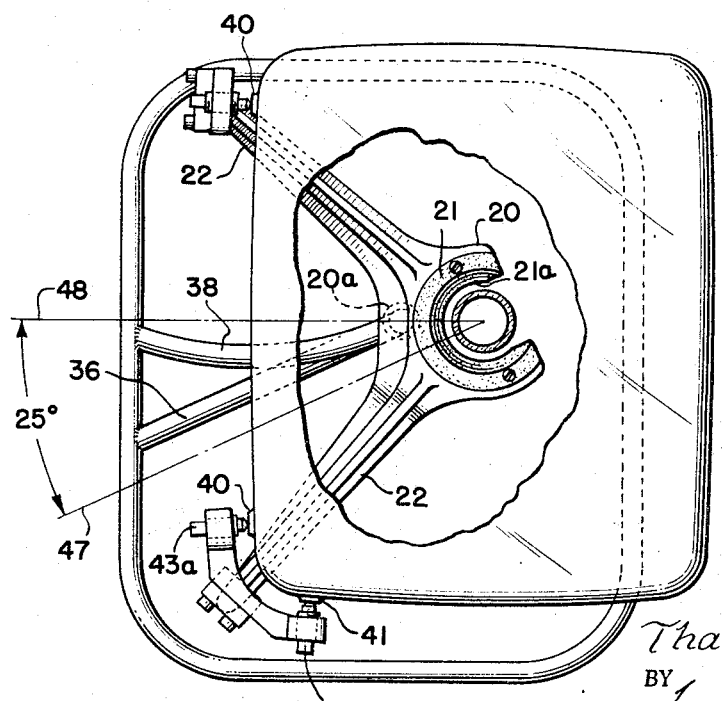

FIGURES 4 and 5 are additional enlarged views, taken on lines 4—4 and 5—5, respectively, in FIGURE 1, showing indexing provisions of the funnel and cap, respectively; and FIGURES 6 and 7 are views corresponding to those of FIGURES 1 and 2, but for a fixture accommodating a rectangular color tube.

Before describing the structure of the fixture, it is appropriate to consider the details of a round shadow mask type of color cathoode-ray tube. Its envelope comprises a funnel 10 and the rim of its large diameter extremity is ground flat to serve as a seat for receiving a companion cap section 11. At its opposite end, the funnel terminates in the usual neck section 12 and at approximately their meeting plane is the yoke reference line designated by dash-dot construction line 13 in the detail of FIGURE 3. This is a reference plane transverse to the axis of the funnel and is an area of closely controlled dimension and configuration. There are a plurality of index provisions, variously referred to as bosses, pads or lands, cast on the external surface of the funnel at a fixed distance from the yoke reference line. The round tube usually has two such provisions, one of which is designated 14 in the detail of FIGURE 4. it is used for indexing purposes in the manufacture of the tube.

Cap 11 also has a plurality, specifically two, index provisions cast on its external surface in the same manner as those of the funnel. One index provision of the cap is designated 16 in FIGURE 5. It is a boss raised from the cap periphery but also having a centrally located recess or V-groove that may receive an index pin. The other index of the cap is a flat boss generally similar to those of the funnel and having the configuration of portion 14 of FIGURE 4. The view of FIGURE 1 is partially broken away to reveal the shadow mask 16 which will have been installed in the cap after the screen has been formed on the internal image area of the cap. The rim of the cap is ground flat and is dimensioned to fit concentrically with the large diameter portion of funnel 10 by superposing one on the other in the manner indicated in FIGURE 1. Dash-dot construction line 17 of FIGURE 1 is the center line of the combined funnel and cap and corresponds to the cap center line established in the lighthouse at the time the screen was being formed on its image area. The desired center line 17 is established and the funnel and cap are maintained in precisely controlled space relation by the fixture of this invention.

The fixture comprises a workholder which receives the funnel and cap, establishes their necessary orientation and maintains it throughout sealing. The fixture has an annular seat 20 with a beveled edge whose internal diameter is equal to the diameter of funnel 11 in the plane of the yoke reference line. The seat has a C-shaped configuration as represented in FIGURE 2 so that the fixture may be loaded by admitting neck section 12 through an opening of the seat. It is desirable to have the portions of the seat and the fixture which make contact with the funnel or cap formed of a material that reduces heat absorption. Carbon, specifically graphite is suitable and, therefore, as indicated in FIGURE 3, seat 20 has a carbon liner 21. Ideally, the liner makes line contact with the envelope at the yoke reference line but since the material is graphite and subject to wear, the liner is shown with a substantial thickness, although its thickness is very small compared with its diameter. The inner surface of the liner is carefully dimensioned and shaped closely to match the dimensions and configuration of funnel 11 in the immediate vicinity of the yoke reference line 13. More particularly, the inner surface of liner 21 has a bevel 21a, providing a sharp edge exactly dimensioned to match the funnel yoke reference line. The edge contact support permits freedom of tilt for adequate contact of the funnel index pads with index pins of the fixture as described hereafter.

Arms extend vertically upwardly from seat 20, two arms 22 being sufficient in the case of the round tube. Their spacing corresponds to that of the index pads or bosses of funnel 10 and a first set of index devices is carried by these arms at the same distance from seat 20 as the spacing of bosses 14 from yoke reference line 13 of funnel 10 to permit engagement of the index devices with the bosses of the funnel. A representative index device is shown in FIGURE 4 and comprises a generally T-shaped portion 25 formed integrally with arm 22. It has recesses for receiving a pair of graphite pins 26 at opposite ends of the T and facing inwardly of the workholder. Each recess has a large diameter portion for housing pin 26 and a smaller diameter portion to accept a tool for knocking the pin out when that is required. Portion 25 of arm 22 has a centrally located aperture threaded to receive a similarly recessed and threaded gauge 27. A further graphite pin 28 is accommodated by the large diameter portion of the recess of gauge 27 and extends forwardly so that elements 26 and 28 are a three-element cluster of support pins for cooperating with bosses 14 of the funnel. The outer pins 26 of the index devices determine the rotational position of the funnel and the center pins 28 hold the funnel firmly in position. The position of center pin 28 in a radial direction may be controlled by rotation of gauge 27 which threads in and out of arm portion 25 and may be locked in a chosen position by a nut 30.

Mounted directly above index device 26, 28 in each arm 22 is a second index device for engaging the index provisions of cap 11. One of the index devices for the cap is shown in FIGURE 5. It has the same type of adjustable gauge element 27' extending through a threaded portion of arm 22 and adjustably secured in position by a nut 30'. In this case, however, the graphite element 32 is shaped to be received in the V-groove or recess formed in one of the bosses of the cap as shown in FIGURE 5. The other index device for engaging the cap would have the same configuration as pin 28 because it engages the edges of a flat land in the same manner that pin 28 engages a boss 14 of the funnel as illustrated in FIGURE 4.

The workholder is supported from a base 35, here shown in the form of a hoop, by means of a support 36 which extends upwardly from base 35 and establishes for a funnel and cap combination contained in the workholder an axis that is canted from the vertical by a selected amount. As indicated in FIGURE 1, the combination is canted by about 10° off vertical. The free end of support 36 carries a pin 37 and seat 20 of the workholder may have a slotted depending sleeve 20a to slide over the pin and couple the workholder to the support. This permits the workholder to be removably attached to its standard. The angular relation of the workholder may be accomplished by shaping support 36 and/or shaping the meeting parts of support 36 and the workholder. A strut 38 may extend from base 35 to support 36 for further mechanical rigidity and, preferably, it is arranged to be coplanar with support 36. This permits a large number of bases to be stored in a very small space. Since the workholder is removable from the base, it is possible to nest workholders for storage in a small space. Also, the fixture permits interchangeability in that any base may serve a variety of workholders.

The plan dimensions of the base exceed the projected dimensions thereon of the funnel-cap combination contained within the workholder. This is easily attained by having hop 35 of sufficient diameter. Additionally, the workholder is constructed to have the same coefficient of thermal expansion as the funel and cap. The material from which the workholder may be formed to satisfy this requirement is a stainless steel alloy having the following composition:

| | Percent |
|---|---|
| C | .5 |
| Mn | 1 |
| Si | 2 |
| P | .04 |
| S | .04 |
| Mo | .5 |
| Cr | 26 to 30 |
| Fe | Remaining |

The percentages are by weight.

In using the described fixture, the operator stands to the left of the fixture as illustrated in FIGURE 1 and places funnel 10 in position. The neck slides easily through the opening of seat 20 and from his position relative to the fixture the operator may orient the funnel to the end that index bosses 14 thereof fall within the triad of index pins 26, 28 as shown in FIGURE 4. This is true of the boss and index pins for each of the two arms 22 of the workholder. When the funnel has seated, it is supported principally by engagement of seat 20 at the yoke reference line. The cap is now put in position as shown in FIGURE 1 with its sealing rim facing that of the funnel, being separated therefrom only by the layer of frit carried by the funnel. The angular orientation of the cap is determined by placing groove 16 on the index of the cap over pin 32 of one index device and then having the other index of the cap contact the remaining index pin of the workholder. Because the workholder holds the combination funnel and cap canted relative to the vertical, these parts are retained by gravity against the index pins. The combination tilts in the direction of arms 22 and along a plane 29—29 that includes center line 17 and is equidistant from the pair of index devices. In other words, the arrangement is symmetrical and the pins are uniformly loaded by gravity.

A fixture made of the alloy specified above has essentially the same coefficient of thermal expansion as the funnel and cap sections currently employed in color cathode-ray tubes. Accordingly, there is no relative movement of the parts during sealing even though high temperatures are encountered and the geometrical relation required to assure proper registration of the electron beams with the phosphor elements of the screen is preserved throughout sealing. The fixture is cast stainless steel and stress relieved; being a fine grain casting, it is very stable. This degree of stability cannot be obtained in fixtures fabricated of drawn metals. Its arms 25 are T-shaped in cross section and are tapered, being of smaller dimension at their free ends. This affords a desirably high weight to strength ratio so that the fixture is rugged but yet without excessive weight which avoids extra heat loading of the lehr.

The hoop type base 35 affords protection in mass production where a series of such fixtures may be expected to be delivered concurrently to and through a lehr. By dimensioning the base as described, the fixtures may contact one another but there will be no resulting damage to the tubes because the contacts occur only on the metal bases.

For the rectangular color tube, the fixture is slightly modified as shown in FIGURE 6. It will be observed from FIGURE 7 that along the major dimension of the rectangular tube, there are two index pads 40, each being located near a corner. There is a similar index 41 on the minor dimension but also at the corner which accommodates an index 40. These index pads, of course, are formed on both the funnel and cap and in all cases they are usually flat bosses. As shown in FIGURE 6, arm 22 in the rectangular fixture has a T-shaped termination and at one end of the T presents a pair of index devices 42 and 43. They may be constructed similar to the index device of FIGURE 5 although it is not necessary to shape the carbon element to match any groove since in this case it merely rests against a flat boss. Index 42 engages the boss on the minor dimension of the funnel and index 43 engages the boss on the minor dimension of the cap. At the other side of the T termination of arm 22 there is a similar arrangement of two index devices 42a and 43a which again contact the funnel and cap, respectively.

It is not necessary to have two pairs of index devices on the remaining arm 22 of the fixture which has a single pair, one to engage a pad of the funnel and one the pad of the cap. Of course, the base must still protect the funnel-cap combination and this is easily obtained by having a base of rectangular configuration dimensioned to be larger than the projection of the combination in the plane of the base.

Again, the fixture establishes an axis for the funnel-cap combination which is canted relative to the vertical by about 10° but there is an additional canting in that the direction of tilt is, in this case, along direction line 47 of FIGURE 7 which is generally in the direction of the corner of the envelope where index provisions are located on both its major and minor dimensions. Actually, a cant of about 25° as indicated in FIGURE 7, is satisfactory. If the fixture had a simple cant from the vertical in the direction of center line 48, as is the case in FIGURE 1, the index devices on the major dimension of the envelope would support the funnel-cap combination but the index devices on the minor dimension would not necessarily contribute. It is preferred to have equal loading at all three sets of index devices and is accomplished by further tilting the combination in the described manner.

The fixture permits sealing of color cathode-ray tubes, either the round or rectangular variety, without misalignment because of the relative movement of parts during sealing. In large measure, this is the result of the fixture's having a coefficient of thermal expansion the same as that of the funnel and cap. Further improvement results if the gauge portions 27, 27' of the index devices are constructed of cold rolled steel which avoids galling that may otherwise be experienced if these elements are formed of the same material as the workholder.

A further advantage of the arrangement resides in the ease of adjustment. The carbon elements which are preferably used to contact the funnel and cap are subject to wear making it necessary to reset the gauge elements 27 from time to time. Since seat 20 is at the yoke reference line, a master may be employed, referenced from that seat, to adjust the gauge elements as required. Moreover, the fixture has a minimum of structural components which minimizes heat shadows and leads to more uniform heating of funnel-cap combination in sealing.

While particular embodiments of the invention have been shown and described, it will be obvious to those skilled in the art that changes and modifications may be made without departing from the invention in its broader aspects, and, therefore, the aim in the appended claims is to cover all such changes and modifications as fall within the true spirit and scope of the invention.

I claim:
1. A sealing fixture for a cathode-ray tube having a funnel with a plurality of index provisions spaced on its external surface at a fixed distance from a transverse reference plane located in the small diameter portion of said funnel, said tube also having a cap with a plurality of index provisions spaced in the same manner as those of said funnel, said fixture comprising:
   a workholder having an annular seat with an internal diameter equal to the diameter of said funnel in said reference plane;
   a plurality of arms in said workholder extending upwardly from said seat and having a spacing corresponding to that of said index provisions of said funnel;
   a first set of index devices carried by said arms at said fixed distance from said seat for engaging said index provisions of said funnel;

a second set of index devices carried by said arms above said first set for engaging said index provisions of said cap;

a base member;

and a support for said workholder extending upwardly from said base and establishing for a funnel and cap combination contained in said workholder an axis that is canted from the vertical by a selected amount; the plan dimensions of said base exceeding the projected dimensions of said combination on said base, said workholder being angularly oriented relative to said base to have substantially equal loading of said index devices by a funnel and cap combination contained in said workholder, and said workholder having the same coefficient of thermal expansion as said funnel and said cap.

2. A sealing fixture for a round cathode-ray tube having a funnel with a pair of index provisions spaced on its external surface at a fixed distance from a transverse reference plane located in the small diameter portion of said funnel, said tube also having a cap with a pair of index provisions spaced in the same manner as those of said funnel, said fixture comprising:

a workholder having an annular seat with an internal diameter equal to the diameter of said funnel in said reference plane;

a pair of arms in said workholder extending upwardly from said seat and having a spacing corresponding to that of said index provisions of said funnel;

a first pair of index devices carried by said arms at said fixed distance from said seat for engaging said index provisions of said funnel;

a second pair of index devices carried by said arms above said first pair of devices for engaging said index provisions of said cap;

a base member;

and a support for said workholder extending upwardly from said base and establishing for a funnel and cap combination contained in said workholder an axis that is canted a selected amount from the vertical and in the direction of said arms and along a plane that includes the center line of said combination and is equidistant from said pairs of index devices;

the plan dimensions of said base exceeding the projected dimensions of said combination on said base and said workholder having the same coefficient of thermal expansion as said funnel and said cap.

3. A sealing fixture for a round cathode-ray tube having a funnel with a pair of index provisions spaced on its external surface at a fixed distance from a transverse reference plane located in the small diameter portion of said funnel, said tube also having a cap with a pair of index provisions spaced in the same manner as those of said funnel, said fixture comprising:

a workholder having an annular seat with an internal diameter equal to the diameter of said funnel in said reference plane;

a pair of arms in said workholder extending upwardly from said seat and having a spacing corresponding to that of said index provisions of said funnel;

a first pair of index devices carried by said arms at said fixed distance from said seat for engaging said index provisions of said funnel;

a second pair of index devices carried by said arms above said first pair of devices for engaging said index provisions of said cap;

a base member in the form of a hoop;

and a support for said workholder extending upwardly from said base and establishing for a funnel and cap combination contained in said workholder an axis that is canted a selected amount from the vertical in the direction of said arms and along a plane that includes the center line of said combination and is equidistant from said pairs of index devices;

the diameter of said base exceeding the projected dimensions of said combination on said base and said workholder having the same coefficient of thermal expansion as said funnel and said cap.

4. A sealing fixture for a cathode-ray tube having a funnel with a plurality of index provisions spaced on its external surface at a fixed distance from a transverse reference plane located in the small diameter portion of said funnel, said tube also having a cap with a plurality of index provisions spaced in the same manner as those of said funnel, said fixture comprising:

a workholder having an annular seat with a liner that is formed of carbon and has an internal diameter equal to the diameter of said funnel in said reference plane;

a plurality of arms in said workholder extending upwardly from said seat and having a spacing corresponding to that of said index provisions of said funnel;

a first set of index devices carried by said arms at said fixed distance from said seat for engaging said index provisions of said funnel;

a second set of index devices carried by said arms above said first set for engaging said index provisions of said cap;

a base member;

and a support for said workholder extending upwardly from said base and establishing for a funnel and cap combination contained in said workholder an axis that is canted from the vertical by a selected amount;

the plan dimensions of said base exceeding the projected dimensions of said combination on said base, said workholder being angularly oriented relative to said base to have substantially equal loading of said index devices by a funnel and cap combination contained in said workholder, and said workholder having the same coefficient of thermal expansion as said funnel and said cap.

5. A sealing fixture for a cathode-ray tube having a funnel with a plurality of index provisions spaced on its external surface at a fixed distance from a transverse reference plane located in the small diameter portion of said funnel, said tube also having a cap with a plurality of index provisions spaced in the same manner as those of said funnel, said fixture comprising:

a workholder having an annular seat with a liner that is formed of carbon and has an internal diameter equal to the diameter of said funnel in said reference plane;

a plurality of arms in said workholder extending upwardly from said seat and having a spacing corresponding to that of said index provisions of said funnel;

a first set of index devices carried by said arms at said fixed distance from said seat for engaging said index provisions of said funnel;

a second set of index devices carried by said arms above said first set for engaging said index provisions of said cap;

the index devices of both of said sets individually comprising a recessed gauge that is adjustable transversely of the one of said arms by which it is carired and further comprising a carbon element projecting from the recess of said gauge to contact the assigned one of said index provisions;

a base member;

and a support for said workholder extending upwardly from said base and establishing for a funnel and cap combination contained in said workholder an axis that is canted from the vertical by a selected amount;

the plan dimensions of said base exceeding the projected dimensions of said combination on said base, said workholder being angularly oriented relative to said base to have substantially equal loading of said index devices by a funnel and cap combination contained in said workholder, and said workholder having the same coefficient of thermal expansion as said funnel and said cap.

6. A sealing fixture for a rectangular cathode-ray tube having a funnel with a pair of index provisions on the external surface of its major dimension and a similar index provision on the surface of its minor dimension, all of said index provisions being at a fixed distance from a transverse reference plane located in the small diameter portion of said funnel, said tube also having a cap with index provisions spaced on its major and minor dimensions in the same manner as those of said funnel, said fixture compirsing:

a workholder having an annular seat with an internal diameter equal to the diameter of said funnel in said reference plane;

a plurality of arms in said workholder extending upwardly from said seat and having a spacing corresponding to that of said index provisions of said funnel;

a first set of index devices carried by said arms at said fixed distance from said seat for engaging said index provisions of said funnel;

a second set of index devices carried by said arms above said first set for engaging said index provisions of said cap;

a base member;

and a support for said workholder extending upwardly from said base and establishing for a funnel and cap combination contained in said workholder an axis that is canted a selected amount from the vertical in the direction of said arms and is further canted toward the junction of said major and minor dimensions an amount to load the individual members of said sets of index devices substantially equally;

the plan dimensions of said base exceeding the projected dimensions of said combination on said base and said workholder having the same coefficient of thermal expansion as said funnel and said cap.

7. A sealing fixture for a rectangular cathode-ray tube having a funnel with a pair of index provisions on the external surface of its major dimension and a similar index provision on the surface of its minor dimension, all of said index provisions being at a fixed distance from a transverse reference plane located in the small diameter portion of said funnel, said tube also having a cap with index provisions spaced on its major and minor dimensions in the same manner as those of said funnel, said fixture comprising:

a workholder having an annular seat with an internal diameter equal to the diameter of said funnel in said reference plane;

a pair of arms in said workholder extending upwardly from said seat, one of said arms having a T-shaped termination to collectively present terminal portions having a spacing corresponding to that of said index provisions of said funnel;

a first set of index devices carried by said terminal portions of said arms at said fixed distance from said seat for engaging said index provisions of said funnel;

a second set of index devices carried by said terminal portions of said arms above said first set for engaging said index provisions of said cap;

a base member;

and a support for said workholder extending upwardly from said base and establishing for a funnel and cap combination contained in said workholder an axis that is canted a selected amount from the vertical in the direction of said arms and is further canted in the general direction of said T-shaped termination an amount to load the individual members of said sets of index devices substantially equally;

the plan dimensions of said base exceeding the projected dimensions of said combination on said base and said workholder having the same coefficient of thermal expansion as said funnel and said cap.

8. A sealing fixture for a cathode-ray tube having a funnel with a plurality of index provisions spaced on its external surface at a fixed distance from a transverse reference plane located in the small diameter portion of said funnel, said tube also having a cap with a plurality of index provisions spaced in the same manner as those of said funnel, said fixture comprising:

a workholder having an annular seat with a liner that is formed of carbon, has a length short compared to its diameter, and an internal bevel forming an edge that has dimensions and a configuration closely matching the dimensions and configurations of said funnel in said reference plane;

a plurality of arms in said workholder extending upwardly from said seat and having a spacing corresponding to that of said index provisions of said funnel;

a first set of index devices carried by said arms at said fixed distance from said seat for engaging said index provisions of said funnel;

a second set of index devices carried by said arms above said first set for engaging said index provisions of said cap;

a base member;

and a support for said workholder extending upwardly from said base and establishing for a funnel and cap combination contained in said workholder an axis that is canted from the vertical by a selected amount;

the plan dimensions of said base exceeding the projected dimensions of said combination on said base, said workholder being angularly oriented relative to said base to have substantially equal loading of said index devices by a funnel and cap combination contained in said workholder, and said workholder having the same coefficient of thermal expansion as said funnel and said cap.

References Cited
UNITED STATES PATENTS

| | | | |
|---|---|---|---|
| 2,237,513 | 4/1941 | Timko | 248—44 |
| 2,760,668 | 8/1956 | Wiederspan et al. | 248—153 X |
| 2,992,513 | 7/1961 | Breadner | 65—154 X |
| 3,118,662 | 1/1964 | Fassett et al. | 269—296 |

ROBERT C. RIORDON, *Primary Examiner.*

E. SUTTON, *Assistant Examiner.*